United States Patent
Voss et al.

(10) Patent No.: US 9,022,083 B2
(45) Date of Patent: May 5, 2015

(54) VARIABLE SURFACE AREA TIRE TREAD AND TIRE

(75) Inventors: Stefan Voss, Greer, SC (US); Jean-Marc D'Harcourt, Clermont-Ferrand (FR); Jeff Godsey, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 395 days.

(21) Appl. No.: 13/063,199

(22) PCT Filed: Sep. 11, 2008

(86) PCT No.: PCT/US2008/075940
§ 371 (c)(1),
(2), (4) Date: Mar. 9, 2011

(87) PCT Pub. No.: WO2010/030276
PCT Pub. Date: Mar. 18, 2010

(65) Prior Publication Data
US 2011/0168311 A1   Jul. 14, 2011

(51) Int. Cl.
*B60C 11/12* (2006.01)
*B60C 11/13* (2006.01)
(Continued)

(52) U.S. Cl.
CPC .......... *B60C 11/032* (2013.01); *B29D 30/0606* (2013.01); *B29D 2030/0613* (2013.01);
(Continued)

(58) Field of Classification Search
CPC ............ B60C 11/0332; B60C 11/1218; B60C 11/0323
USPC ............................ 152/209.18, 209.21, DIG. 3
See application file for complete search history.

(56) References Cited

U.S. PATENT DOCUMENTS

| 1,413,190 A | 4/1922 | Bapson |
| 1,509,259 A | 9/1924 | Rett et al. |

(Continued)

FOREIGN PATENT DOCUMENTS

| DE | 2 024 279 | 3/1971 |
| EP | 0 540 340 A2 | 5/1993 |

(Continued)

OTHER PUBLICATIONS

English machine translation of Kunugi (JP2001-130227), Mar. 2001.*

(Continued)

*Primary Examiner* — Justin Fischer
*Assistant Examiner* — Robert Dye
(74) *Attorney, Agent, or Firm* — Hahn Loeser & Parks LLP

(57) ABSTRACT

Particular embodiments of the present invention include a multi-stage tire tread having a plurality of wear layers, each said layer being located at a different depth of the tire tread, the tread including one or more tread elements including a contact surface and having a first wear layer and a second wear layer, wherein the second wear layer is located below the first wear layer. The tire tread also includes a longitudinal groove extending in a longitudinal direction within the second wear layer of the tread element, wherein said longitudinal groove becomes exposed after a depth of the first wear layer has been worn. The tire tread further includes one or more lateral grooves extending from the longitudinal groove in a lateral direction within the second wear layer of the tread element. The invention also provides a mold element for forming portions of the multi-stage tread.

15 Claims, 8 Drawing Sheets

(51) Int. Cl.
*B60C 11/03* (2006.01)
*B29D 30/06* (2006.01)

(52) U.S. Cl.
CPC ............. *B60C11/0306* (2013.01); *B60C 11/12* (2013.01); *B60C 11/1218* (2013.01); *B60C 2011/1213* (2013.01); *B60C 11/1281* (2013.01); *B60C 11/0323* (2013.01); *B60C 2011/1268* (2013.01); *B60C 2011/0369* (2013.01); *Y10S 152/03* (2013.01)

(56) References Cited

U.S. PATENT DOCUMENTS

| | | | |
|---|---|---|---|
| 2,121,871 A | 6/1938 | Havens | |
| 2,121,955 A | 6/1938 | Eger | |
| 2,264,767 A | 12/1941 | Ofensend | |
| 2,327,057 A | 8/1943 | Ofensend | |
| 2,637,362 A | 5/1953 | Briscoe et al. | |
| 2,696,863 A | 12/1954 | Ewart et al. | |
| 3,115,919 A | 12/1963 | Roberts | |
| 3,373,790 A | 3/1968 | Newman et al. | |
| 3,653,422 A | 4/1972 | French | |
| 3,770,040 A | 11/1973 | De Cicco | |
| 3,945,417 A | 3/1976 | Harrelson, Jr. | |
| 3,998,256 A | 12/1976 | Verdier | |
| 4,703,787 A | 11/1987 | Ghilardi | |
| 4,723,584 A | 2/1988 | Yamaguchi et al. | |
| 4,794,965 A | 1/1989 | Lagnier | |
| 4,832,099 A | 5/1989 | Matsumoto | |
| 4,994,126 A | 2/1991 | Lagnier | |
| 5,316,063 A | 5/1994 | Lagnier | |
| 5,445,691 A | 8/1995 | Nakayama et al. | |
| 5,503,207 A | 4/1996 | Fujiwara et al. | |
| 5,535,798 A | 7/1996 | Nakamura | |
| 5,769,977 A | 6/1998 | Masaoka | |
| 5,783,002 A | 7/1998 | Lagnier | |
| 6,012,499 A | 1/2000 | Masaoka | |
| 6,102,092 A | 8/2000 | Radulescu | |
| 6,123,130 A | 9/2000 | Himuro | |
| 6,196,288 B1 | 3/2001 | Radulescu et al. | |
| 6,315,018 B1 | 11/2001 | Watanabe | |
| 6,382,283 B1 | 5/2002 | Caretta | |
| 6,408,910 B1 | 6/2002 | Lagnier et al. | |
| 6,412,531 B1 | 7/2002 | Janajreh | |
| 6,439,284 B1 | 8/2002 | Fontaine | |
| 6,443,200 B1 | 9/2002 | Lopez et al. | |
| 6,461,135 B1 | 10/2002 | Lagnier et al. | |
| 6,467,517 B1 | 10/2002 | Radulescu | |
| 6,668,885 B2 | 12/2003 | Ishiyama | |
| 6,668,886 B1 | 12/2003 | Iwamura | |
| 6,761,197 B2 | 7/2004 | Carra et al. | |
| 6,776,204 B2 * | 8/2004 | Cesarini et al. | 152/209.8 |
| 6,799,616 B2 | 10/2004 | Himuro | |
| 7,017,634 B2 | 3/2006 | Radulescu et al. | |
| 7,249,620 B2 | 7/2007 | Croissant et al. | |
| 7,793,692 B2 | 9/2010 | Nguyen et al. | |
| 8,276,629 B2 * | 10/2012 | Bonhomme | 152/209.21 |
| 2002/0033214 A1 | 3/2002 | Carra et al. | |
| 2005/0081972 A1 | 4/2005 | Lopez | |
| 2005/0121124 A1 | 6/2005 | Tsubono | |
| 2006/0088618 A1 | 4/2006 | Radulescu et al. | |
| 2007/0095447 A1 | 5/2007 | Nguyen et al. | |
| 2007/0199634 A1 | 8/2007 | Sakamaki | |
| 2007/0295434 A1 | 12/2007 | Nguyen et al. | |
| 2009/0065115 A1 | 3/2009 | Mathews | |
| 2009/0159167 A1 * | 6/2009 | Scheuren | 152/209.18 |
| 2009/0301622 A1 | 12/2009 | Brown | |
| 2011/0277898 A1 | 11/2011 | Barraud et al. | |

FOREIGN PATENT DOCUMENTS

| | | | |
|---|---|---|---|
| EP | 0 721 853 A1 | | 7/1996 |
| EP | 1782970 | | 9/2007 |
| EP | 1 920 951 A1 | | 5/2008 |
| EP | 1920951 A1 | | 5/2008 |
| EP | 1 935 671 A2 | | 6/2008 |
| EP | 1935671 A2 | | 6/2008 |
| FR | 2909588 | * | 6/2008 |
| GB | 474588 A | | 11/1937 |
| GB | 2 061 837 A | | 5/1981 |
| GB | 2061837 A | | 5/1981 |
| JP | 02-060805 | | 3/1990 |
| JP | 2 310108 A | | 12/1990 |
| JP | 3-90317 | * | 4/1991 |
| JP | 03090317 A | | 4/1991 |
| JP | 3-112705 | * | 5/1991 |
| JP | 03112705 A | | 5/1991 |
| JP | H05-169913 A | | 7/1993 |
| JP | 5-338412 A | | 12/1993 |
| JP | 5338412 B2 | | 12/1993 |
| JP | 2001 063323 A | | 3/2001 |
| JP | 2001-130227 | | 5/2001 |
| JP | 2002-501458 | | 4/2002 |
| JP | 2004009886 | | 1/2004 |
| JP | 2005-104194 A | | 4/2005 |
| JP | 2005104194 A | | 4/2005 |
| JP | 2006-51863 | * | 2/2006 |
| JP | 2006051863 A | | 2/2006 |
| WO | 02/38399 A2 | | 5/2002 |
| WO | 0238399 A2 | | 5/2002 |
| WO | 2010030276 A1 | | 3/2010 |
| WO | 2010/039148 A1 | | 4/2010 |

OTHER PUBLICATIONS

English translation of JP03-112705, dated May 1991.*
JP-H05-169913-A—English abstract obtained from Patent Abstracts of Japan (http://www19.ipdl.inpit.go.jp) on Aug. 16, 2012, 1 page.
JP 2002-501458 A—English abstract obtained from Espacenet (http://worldwide.espacenet.com) on Aug. 16, 2012, 2 pages.
JP 5-338412 A—English abstract obtained from Espacenet (http://worldwide.espacenet.com) on Jul. 26, 2012, 2 pgs.
JP 2005-104194 A—English abstract obtained from Espacenet (http://worldwide.espacenet.com) on Jul. 26, 2012, 2 pgs.
PCT/US2008/063801 International Search Report and Written Opinion dated Feb. 16, 2009.
PCT/US2008/075940 International Search Report and Written Opinion dated Nov. 18, 2008.
JP 2 310108 A—English abstract obtained from Espacenet (http://worldwide.espacenet.com) accessed on Feb. 2, 2012, 1 page.
JP 2001 063323 A—English abstract obtained from Espacenet (http://worldwide.espacenet.com) accessed on Feb. 2, 2012, 1 page.
International Search Report (PCT/ISA/210) issued on Mar. 15, 2010, by European Patent Office as the International Searching Authority for International Application No. PCT/EP2009/066219.

* cited by examiner

VARIABLE SURFACE AREA TIRE TREAD AND TIRE

This application is a National Stage application of International Application No. PCT/US2008/075940, filed Sep. 11, 2008, to which this application claims priority and the benefit of, the disclosure of which is also hereby incorporated by reference.

BACKGROUND OF THE INVENTION

1. Field of the Invention

The invention relates generally to a tire tread. More specifically, this invention relates to tire treads having variable surface area.

2. Description of the Related Art

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions.

One common problem faced by tire manufacturers is how to extend the life of a tire tread. One solution is to increase the tread thickness; however, increasing tread thickness (i.e., depth) generally increases heat generation and rolling resistance. Therefore, it may be desirous to reduce the thickness of a tire tread to improve tread stiffness, and, consequently, improve the tire's rolling resistance and tread operating temperature. This may then allow the use of improved tread compounds having an improved wear rate, which may comprise, for example, SBR or other high hysteresis compounds, even though the improved compound may otherwise increase tread operating temperatures and/or rolling resistance. This is because lowering the tread thickness may reduce or negate the effects of the high hysteresis tread compound.

Another common problem faced by tire manufacturers is how to maintain and/or improve tire performance during the life of a tire. For example, it may be desired to maintain and/or improve tire performance in wet and/or off-road conditions as the tread wears. Tires commonly used in wet and/or off-road tire conditions generally include treads having surface and volumetric voids. In an attempt to maintain or improve wet and/or off-road performance in worn tread stages, the existing surface voids and volumetric voids may be increased in size to provide additional void for the worn tire tread, or additional surface features added to increase the void. However, these alternations may increase the surface and/or volumetric void in the initial or early stages of the tire beyond that which is desired, and/or the tread becomes less stiff, each of which may negatively affect tire performance. Therefore, there is a need for a tire tread that provides increased void performance at worn stages, especially in the central or intermediate portions of the tread width, without sacrificing tire performance.

SUMMARY OF THE INVENTION

Particular embodiments of the present invention include tire treads having a plurality of wear layers. Particular embodiments of the present invention include a multi-stage tire tread having a contact surface and a plurality of wear layers, each said layer being located at a different depth of the tire tread, the tread including one or more tread elements including a contact surface and having a first wear layer and a second wear layer, wherein the second wear layer is located below the first wear layer. The multi-stage tire tread also includes a longitudinal groove extending in a longitudinal direction within the second wear layer of the tread element, wherein said longitudinal groove becomes exposed after a depth of the first wear layer has been worn. The multi-stage tire tread further includes one or more lateral grooves extending from the longitudinal groove in a lateral direction within the second wear layer of the tread element.

Particular embodiments of the present invention also include a mold element for forming at least one wear layer within a multi-stage tire tread, the tire tread having a contact surface and a thickness, the mold element including a longitudinal groove form capable of forming a submerged longitudinal groove within a portion of the tread thickness below the contact surface. The mold element further includes one or more lateral groove forms located along a length of the longitudinal groove form, each of the lateral groove forms extending at an angle relative to a lengthwise direction of longitudinal groove form, where each of the lateral groove members are capable of forming a submerged lateral groove within a portion of the tread thickness below the contact surface. The mold element further includes a longitudinal sipe form extending from longitudinal groove member, and capable of forming a longitudinal sipe within the tread. The mold element also includes a lateral sipe form extending along a length of a lateral groove form, and capable of forming a lateral sipe within the tread.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
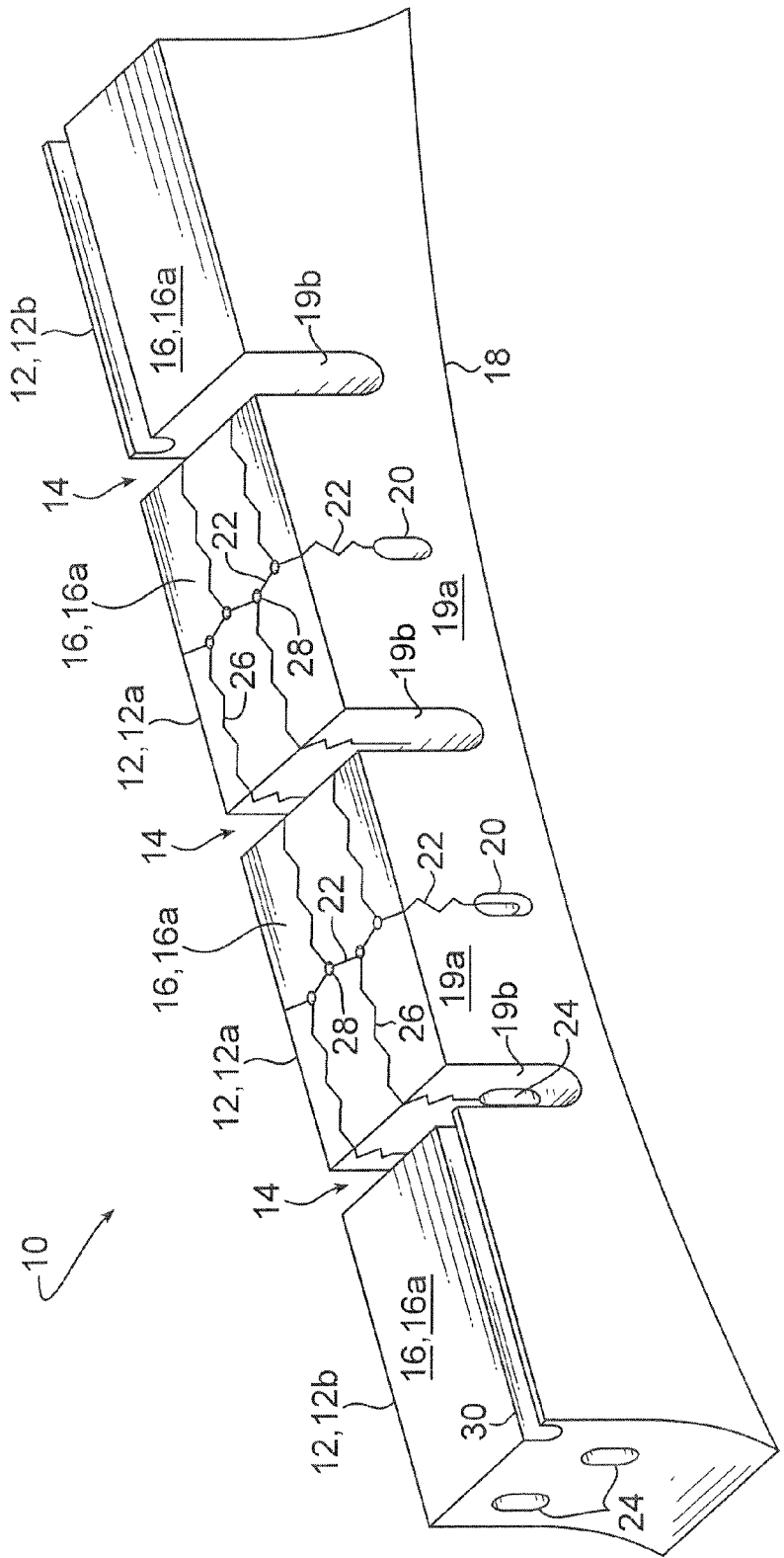
FIG. 1 is a top perspective view of a multi-stage tire tread, according to an embodiment of the invention.
Figure 2:
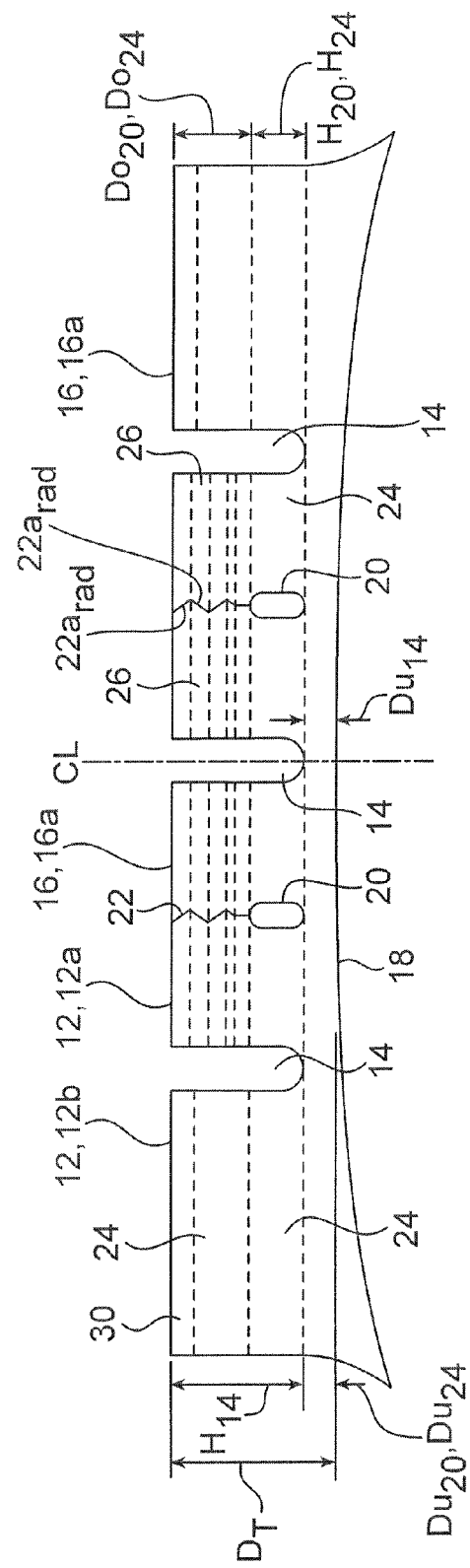
FIG. 2 is a cross-sectional view of the multi-stage tire tread of FIG. 1, in accordance with an embodiment of the invention.
Figure 3:
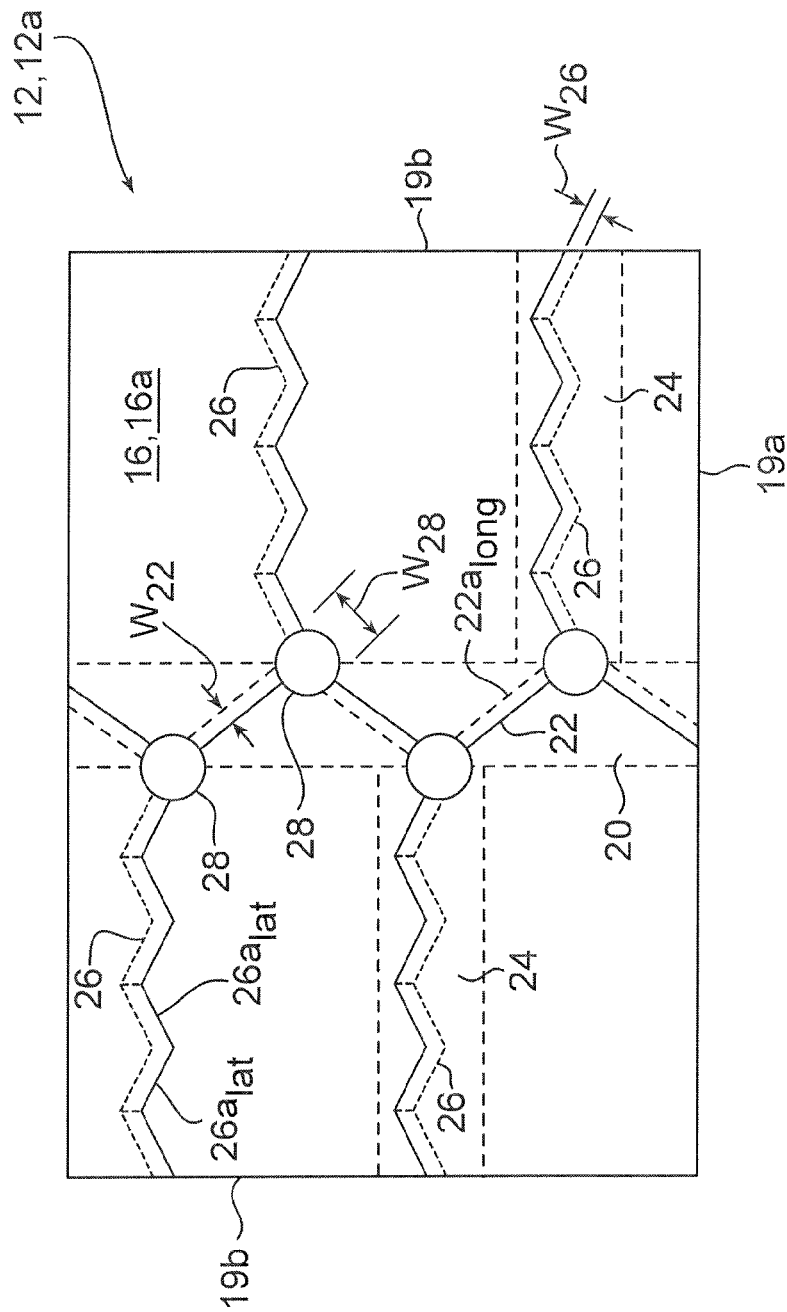
FIG. 3 is a top view of an intermediate lug of the tread shown in FIG. 1, according to an embodiment of the invention.
Figure 4:
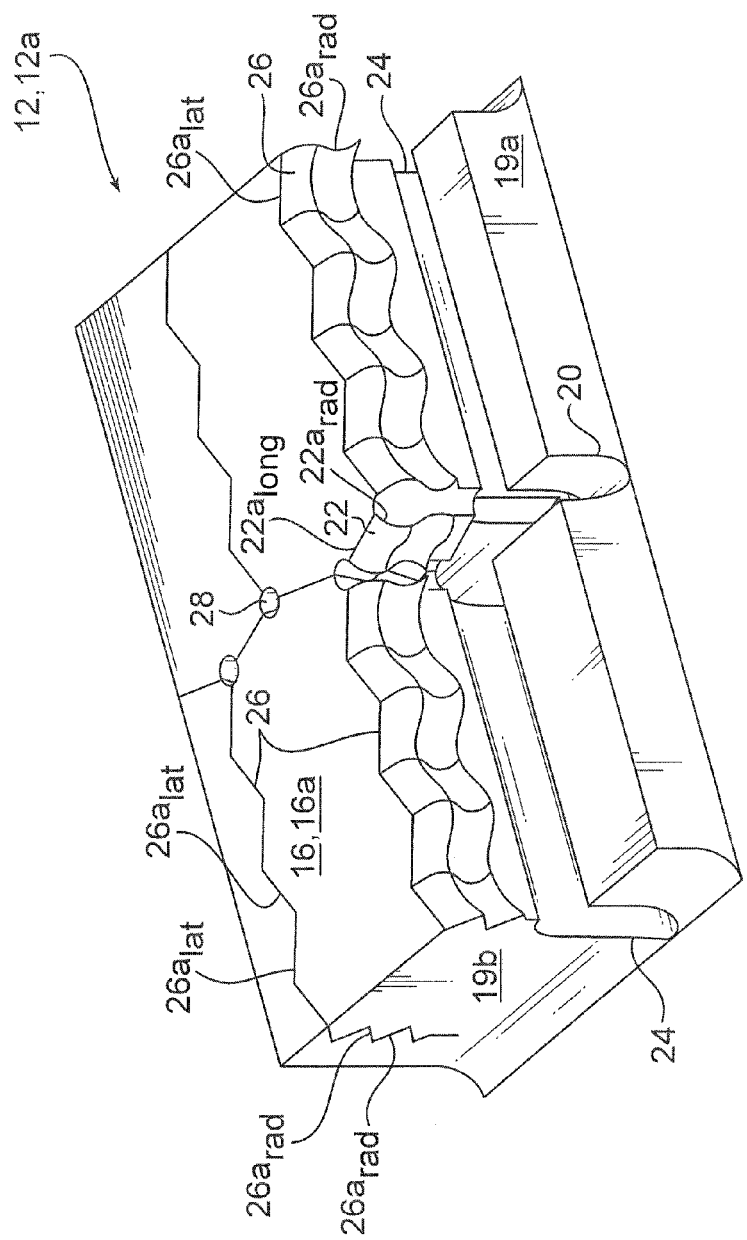
FIG. 4 is a cutaway perspective view of lug shown in FIG. 1, according to an embodiment of the invention.

Particular embodiments of the present invention provide a tire tread having multiple wear stages or layers. It is generally known that as a tire wears, the outer tread surface wears through the depth or thickness of a tire tread. By utilizing various tread features, such as sipes and grooves, traction edges and voids may be added to the outer surface of the tread to improve tire performance. Voids may comprise surface voids or volumetric voids. Surface void refers to the amount of void present along a tire surface. The amount of void present in a contact patch of a tire (i.e., the tire's footprint) is often considered and analyzed, the contact patch being the interface between the tire and the surface upon which the tire operates. Accordingly, the contact patch is an area of contact between the tire tread and the operating surface, and includes any contact surfaces and surface void associated with the engaging portion of the tire tread. The ratio between the tread contact surface area and the total area of the contact patch (i.e., tread contact surface plus tread surface void) is known as the contact surface ratio ("CSR"). The amount of volumetric void is also considered and analyzed, as this void may be desirable to channel water in wet or off-road conditions. In various embodiments of the present invention, tread features are submerged (i.e., located or contained within) the tread depth, to provide a tire tread having multiple wear layers. The initial wear layer comprises the outer tread surface of a new tire, while the tread features associated with one or more submerged (i.e., hidden) wear layers become exposed after a desired amount of tread is worn from the tire. The subsequently (newly) exposed worn tread surfaces operate as the tread's contact surface. The hidden tread layer may include or exclude an arrangement of tread features, such as voids, sipes, and/or grooves, to provide a tread contact surface having particular performance characteristics, which may include, for example, having a desired CSR, volumetric void, and/or quantity of traction edges. The arrangement of tread features may also affect tread stiffnesses, which may alter tread and tire performance as desired.

In an attempt to maintain or improve tire performance during a tire tread's lifetime, a tire tread having multiple wear stages is generally provided as 10. In an embodiment shown in FIGS. 1-5, tread 10 generally comprises one or more tread elements 12, each of which may comprise a rib or a lug. A rib generally extends about the length of a tread, where the length is associated with a circumference of an associated tire. Independent ribs, as well as independent lugs, may be separated by longitudinal grooves 14. Longitudinal grooves 14, as well as submerged (i.e., internal) longitudinal grooves 20, extend lengthwise along a length of the tread 10, which includes extending parallel to a tread centerline CL or in a plane normal to a rotational axis of a tire, or at an angle relative such centerline CL or normal plane. Circumferential grooves are longitudinal grooves 14 that extend the full length, or circumference, of the tire tread 10. A rib may be parsed into a plurality of segments or lugs by lateral grooves, such as, for example, submerged lateral grooves 24. Lateral grooves, such as grooves 24, extend sideways along a width of the tread 10 at an angle relative to a tread centerline CL or a longitudinal groove 14, 20. Lugs may exist without being associated with a rib, that is, in other words, lugs may be arbitrarily arranged so to not collectively extend in an ordered fashion along a length of tire tread 10 to form or represent a partitioned rib.

Figure 5:
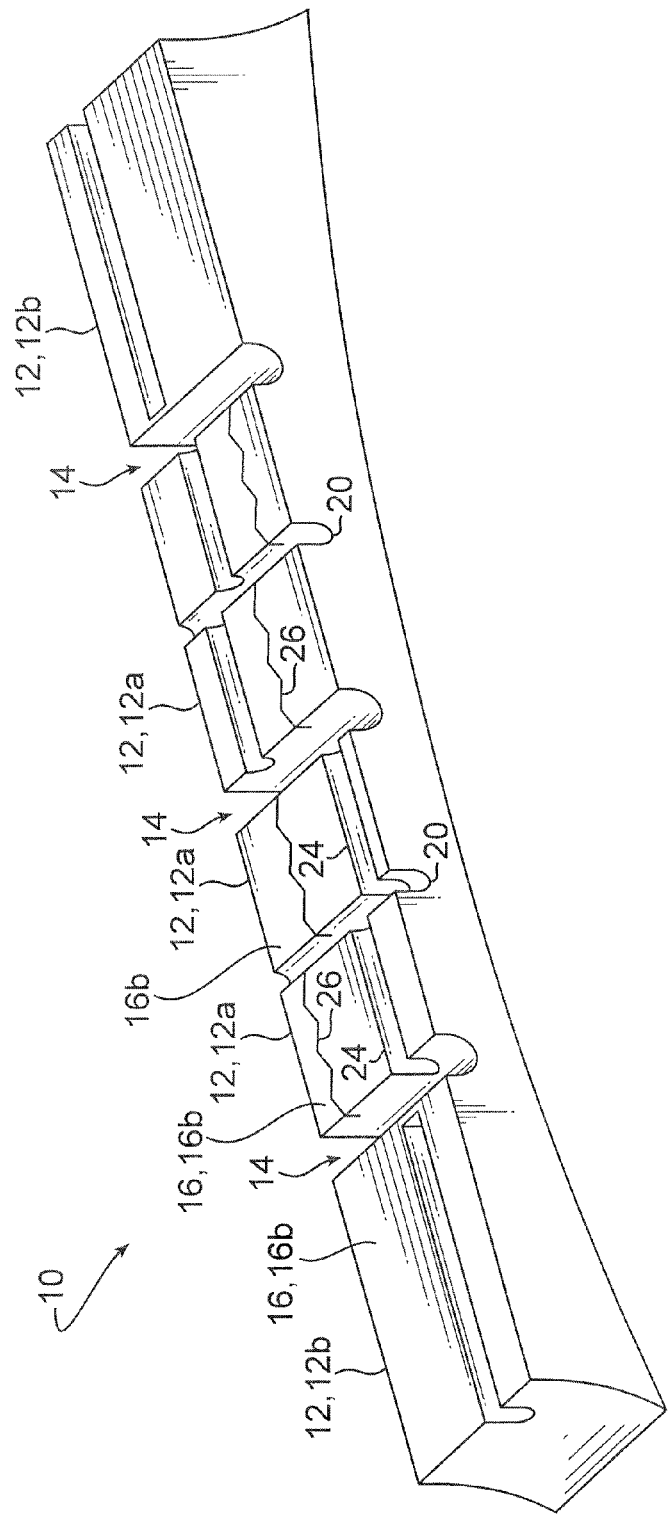
FIG. 5 a top perspective view of the multi-stage tire tread of FIG. 1, the tread being shown in a worn condition to expose a second wear layer, according to an embodiment of the invention.

In one embodiment, as shown in FIGS. 1-5, tread elements 12 may comprise one or more intermediate tread elements 12a, each of which are generally located between a pair of shoulder tread elements 12b. Shoulder elements 12b are generally located along the sides of tread 10. Multiple tread elements 12 are separated by longitudinal grooves 14. Tread 10 includes a top surface 16 and a bottom surface 18. Top surface 16 is generally associated with an exterior surface of a tire, and at least a portion thereof may form a tread contact surface within a footprint. Top surface 16 may also include surface features, which may comprise recessions or protrusions to accomplish functional or ornamental purposes. Surface features generally extend approximately 5 mm or less into tread 10, and may include, for example, depression 30. Top surface 16 may exist in an initial (new) or previously worn state 16a, or in a subsequently worn state 16b, such as is shown in FIG. 5. Bottom surface 18 is generally located opposite top surface 16, and is used to engage a tire carcass or a component interposed between the tread and tire carcass, which may comprise, for example, a sub-tread or cushion gum layer. Extending between top surface 16 and bottom surface 18, tread 10 generally includes a thickness $D_T$. In particular embodiments, tread thickness $D_T$ measures 15 to 25 millimeters (mm); however, at the higher tread thicknesses $D_T$ there may be a more limited selection of tread compounds that may be used. For example, the use of SBR or other high hysteresis compounds may be more difficult to use with thicker tread thicknesses $D_T$.

With continued reference to FIGS. 1-5, tread 10 generally includes a submerged longitudinal groove 20 extending internally within one or more tread elements 12 at a depth $Do_{20}$ below tread top surface 16a. Longitudinal groove 20 is generally associated with an embedded or hidden wear stage or layer, which may become exposed after depth $Do_{20}$ is worn from a portion of tread 10, as shown in FIG. 5. When a portion of tread 10 has been worn through depth $Do_{20}$, previously submerged longitudinal groove 20 becomes exposed to provide additional surface void to the worn tread surface 16b, and additional volumetric void in communication tread surface 16b. Exposed longitudinal groove 20 may also reduce the stiffness of the associated tread element 12, as well as provide additional traction edges that are more effective than previously existing edges, such as, for example, those associated with sipes 22. Additional traction edges may be provided, for example, when no sipes 22 extend between groove 20 and top surface 16. In particular embodiments, $Do_{20}$ is equal to or greater than 4 mm. The transverse width of each submerged longitudinal groove 20 may comprise any desired distance. In an exemplary embodiment, the width of each submerged longitudinal groove 20 is between 4 and 5 mm.

Each longitudinal groove 20 is generally positioned a minimum distance $Du_{20}$ above the bottom surface 18 of the tread. By maintaining longitudinal groove 20 a distance $Du_{20}$ above the tire belt, excess tread material is provided as a subtread for future handling and performance of the tire. In particular embodiments, distance $Du_{20}$ may be greater than 2 mm, and in other embodiments, greater than 3.5 mm. Further, $Du_{20}$ may be equal to or greater than one-half of $Du_{14}$, where $Du_{14}$ is the distance between the bottom of groove 14 and the bottom 18 of the tread 10. Longitudinal groove 20 also includes a height $H_{20}$. Height $H_{20}$ may extend any desired distance. In particular embodiments, height $H_{20}$ may be equal to or greater than 20% of $Do_{20}$. In other embodiments, height $H_{20}$ is equal to or greater than 2 mm. Height $H_{20}$ may also extend a maximum distance equal to 400% of distance $Do_{20}$, and in particular embodiments, equal to 200% of $Do_{20}$, and in still other embodiments, 100% of $Do_{20}$.

Longitudinal groove 20 also extends generally along the length of tread 10 as described above, and therefore, may (or may not) extend approximately the full length of tread 10 to form a circumferential groove. It follows that a longitudinal groove 20 may (or may not) extend through a length of a tread element 12, such as a rib or lug, to an exterior surface thereof, such as, for example, fore and aft exterior surfaces 19a. Although the embodiment shown in the FIGURES shows longitudinal grooves 20 extending within intermediate tread elements 12a, longitudinal grooves 20 may extend in any tread element 12, including one or more intermediate tread elements 12a and/or shoulder elements 12b. For any longitudinal groove 20, depths $Do_{20}$ and $Du_{20}$ may vary along a length of such groove 20, and/or may vary from other grooves 20, 24 located within tread 10. Similarly, for any groove 20, groove height $H_{20}$ may vary along a length of a groove 20, and/or may vary from the heights of other grooves 20, 24. By allowing each groove 20 to have different (i.e., independent) depths $Do_{20}$ and $Du_{20}$ and heights $H_{20}$, various wear stages may be provided to allow hidden grooves or voids to become exposed at different worn tread stages or depths. Therefore, multiple wear stages (i.e., two or more) may be provided within a tread 10. In the embodiment shown in FIG. 5, intermediate tread elements 12a include a first wear stage having a depth $Do_{20}$ and a second wear stage corresponding to groove height $H_{20}$.

As shown in FIGS. 1-5, one or more submerged lateral grooves 24 may extend internally within a tread element 12 at a depth $Do_{24}$ below top surface 16a. Lateral groove 24 is generally associated with an embedded or hidden wear stage or layer, which may become exposed after depth $Do_{24}$ is worn from a portion of tread 10, as shown in FIG. 5. In similar fashion to longitudinal grooves 20, lateral grooves 24 provide additional surface void to top surface 16, as well as additional volumetric void in communication therewith when exposed to form a worn portion of the top surface 16b. Further, exposed lateral grooves 24 may reduce the stiffness of the associated tread element, and provide more effective and/or additional traction edges. In particular embodiments, $Do_{24}$ is equal to or greater than 4 mm. The transverse width of each submerged lateral groove 24 may comprise any desired distance. In an exemplary embodiment, the width of each submerged lateral groove 26 is between 4 and 5 mm.

Lateral grooves 24 may extend in any tread element 12, including one or more intermediate tread elements 12a and/or shoulder elements 12b. In the embodiments shown, lateral grooves 24 extend from a submerged longitudinal groove 20 to an exterior surface of tread element 12, namely, side surface 19b. It can also be said that lateral grooves 24 and sipes 26 do not extend fully between the lateral side surfaces 19b of a tread element 12, but rather may extend from an interior or intermediate location within a tread element 12 to a lateral side surface 19b of such tread element 12 as shown within tread element 12a in FIGS. 3-5. In other words, each of the one or more lateral grooves has a pair of ends, one of the ends being in communication with a side surface 19b of the tread element 12, and the other of the ends being in communication with the longitudinal groove 20. Further, in particular embodiments, such as is shown in FIGS. 1-5 in tread elements 12a, lateral grooves 24, as well as any sipes 26, extend from an intermediate portion of a tread element 12 to a lateral side surface 19b of such element 12 to form a longitudinally alternating arrangement (i.e., a staggered arrangement) of lateral grooves 24 and/or sipes 26 along a length of a submerged longitudinal groove 20. In particular embodiments, such as is shown in the FIGURES, the alternating arrangement is provided by having one lateral groove 24 and/or sipe 26 that generally extends from one side of a submerged longitudinal groove 20 at a first lengthwise position along groove 20 to one lateral side surface 19b of the tread element 12, while another lateral groove 24 and/or sipe 26 extends from the other side of the submerged longitudinal groove 20 at a second lengthwise position along groove 20 to the other lateral side surface of the tread element 12. In other embodiments, it is contemplated that each such lateral groove 24 and sipe 26 may also extend partially along the other side of longitudinal groove 20, so long as it does not extend fully to the other side surface of element 12. By providing an alternating arrangement and/or lateral grooves 24 and/or lateral sipes 26 that do not fully extend laterally through a tread element 12, the stiffness of the tread element may be maintained (as a fully extending lateral groove 24 and/or sipe 26 may further decrease tread element stiffness). In particular embodiments, the longitudinal spacing between submerged lateral grooves 24 spaced along one side of submerged longitudinal groove 20 is between 40 and 50 mm (this spacing is opposed to the longitudinal spacing between any of the submerged lateral grooves 24 alternating along either side of submerged longitudinal groove 20). In particular embodiments, the longitudinal spacing between lateral sipes 26 is between 5 and 20 mm. In other embodiments, the spacing may be less than 15 mm. In other embodiments, each lateral groove 24 may not extend from a longitudinal groove 20, which may or may not be present. Further, a lateral groove 24 may not extend to an exterior surface of tread element 12, such as side surface 19b, and instead remain within a tread element 12.

In the present embodiment, each lateral groove 24 includes a height $H_{24}$, which extends within thickness $D_T$ of tread 10, and is located at a depth $Du_{24}$ above the tread bottom 18 (or, above the tire carcass or belt). In particular embodiments, distance $Du_{24}$ may be greater than 2 mm, and in other embodiments, greater than 3.5 mm. In one embodiment, $Du_{24}$ is equal to or greater than one-half of $Du_{14}$. Distance $H_{24}$ may be any desired distance. In particular embodiments, Height $H_{24}$ may be equal to or greater than 20% of $Do_{24}$. In other embodiments, $H_{24}$ is equal to or greater than 2 mm. Height $H_{24}$ may also extend a maximum distance equal to 400% of distance $Do_{24}$, and in particular embodiments, equal to 200% of $Do_{24}$, and in still other embodiments, 100% of $Do_{24}$. For any lateral groove 24, depths $Do_{24}$ and $Du_{24}$ may vary along a length of such groove 24, and/or may vary from other grooves 20, 24 located within tread 10. Similarly, for any groove 24, groove height $H_{24}$ may vary along a length of a groove 24, and/or may vary from the heights other grooves 20, 24. Accordingly, longitudinal grooves 20 and lateral grooves 24 may operate at different depths within tread 10, and, therefore, may form variable and/or different tread wear stages.

Figure 6:
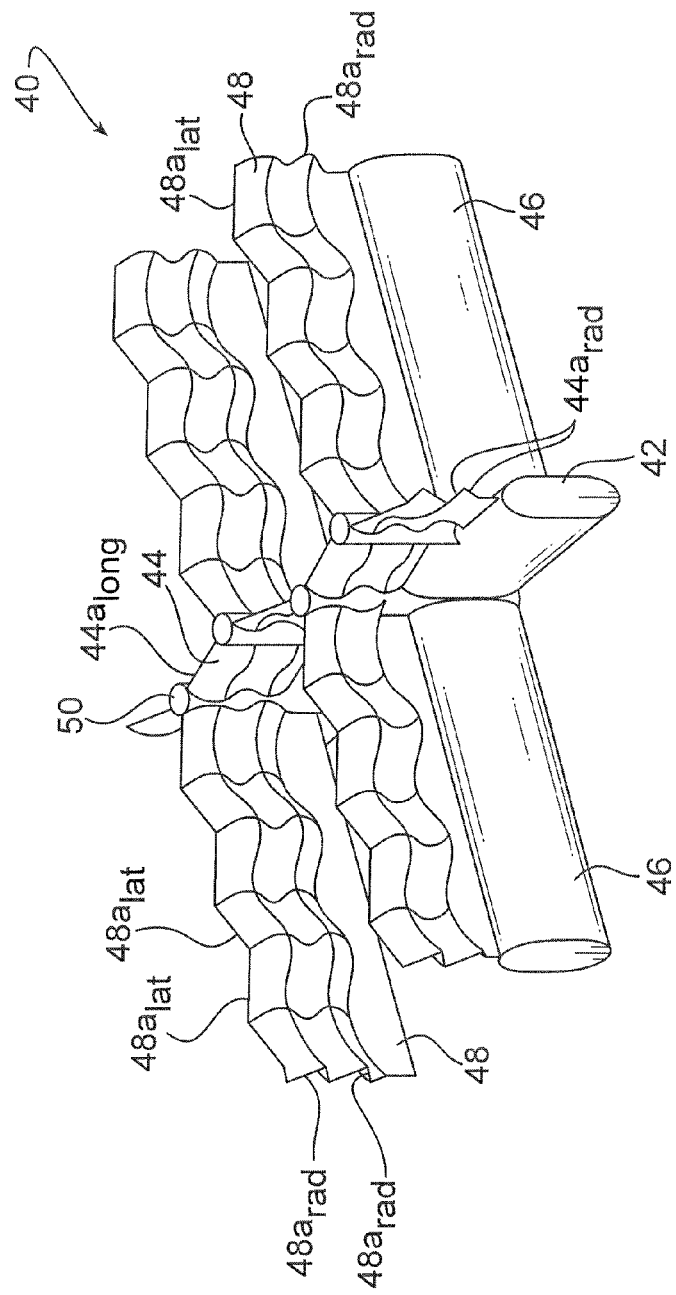
FIG. 6 is a perspective view of a mold element, the mold element being used during a tire molding process to form the tire tread of FIG. 1, according to an embodiment of the invention.
Figure 7:
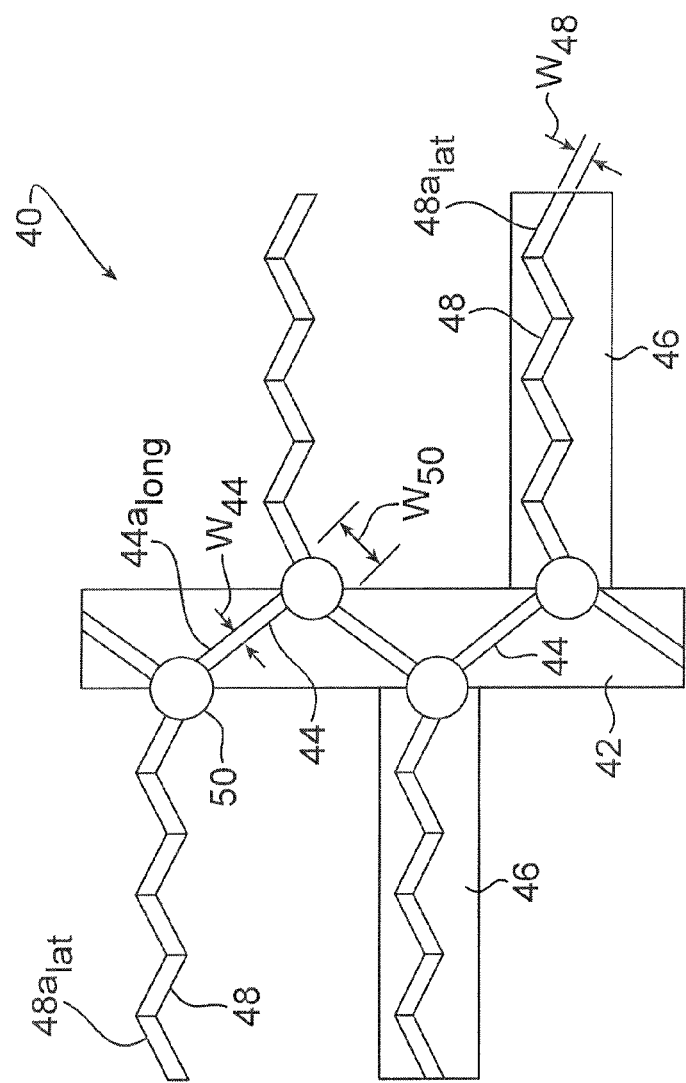
FIG. 7 is a top view of the mold element shown in FIG. 7.

In the embodiment shown in FIGS. 1-5, sipes 22, 26 extend between top surface 16, and any longitudinal groove 20 and lateral groove 24, respectively. Sipes 22, 26 are generally slits in the tread 10 that extend through a thickness thereof, and include a width that allows each sipe 22, 26 to substantially remain closed when traveling through a tire footprint, even though the sides (of each such sipe 22, 26) may be shifted or otherwise distorted relative each other. Sipes 22, 26 may provide traction edges along top surface 16, in an initial state 16a and/or in a worn state 16b, and may reduce the stiffness of the associated tread element 12, which may comprise an intermediate element 12a or a shoulder element 12b. Sipes 22, 26 may also provide access for removal of a mold element from tread 10 after a curing process. A representative mold element 40 is shown in FIGS. 6-7. A radial groove 28 (which may be more generally referred to as a "sipe-intersecting groove") may be located at the intersection between an adjoining pair of sipes 22, 26. Although radial groove 28 generally extends radially within tread 10, groove 28 may be inclined relative to the radial direction, such as, for example, being inclined relative to the rolling direction. Radial groove 28 also includes a width (or diameter) $W_{28}$. In particular embodiments, width $W_{28}$ may be at least the width $W_{22}$, $W_{26}$ of any intersecting sipe 22, 26, respectively. Sipes 22, 26 may or may not extend from, and/or along, each groove 20, 24. Further, sipes 22, 26 may extend fully or partially across each corresponding tread element 12. Radial groove 28 may comprise any cross-sectional shape, which may be, for example, a circular or elliptical.

In the embodiments shown in the FIGURES, each sipe 22, 26 generally extends in two primary directions. Specifically, sipe 22 generally extends in primarily longitudinal and radial directions, while sipe 26 generally extends in primarily lateral and radial directions. In one embodiment, sipe 22 extends radially from top surface 16 to a depth $Do_{20}$, and sipe 26 extends radially from top surface 16 to a depth $Do_{24}$. Each sipe 22, 26 may extend in any of its primary directions in an alternating or zig-zag path. Such path may be, for example, curvilinear or linearly stepped. With reference to the embodiment shown in the FIGS. 1-5, each sipe 22, 26 extends in both primary directions in a linearly stepped alternating path. Specifically, sipe 22 generally extends in a radial direction in an alternating path, the path being formed by one or more linear radial steps $22a_{rad}$, where each step $22a_{rad}$ extends radially as well as laterally. Further, sipe 22 generally extends in a longitudinal direction in an alternating path, the path being formed by one or more linear longitudinal steps $22a_{long}$, where each step $22a_{long}$ extends longitudinally as well as laterally. Likewise, sipe 26 extends radially in an alternating path formed by one or more linear radial steps $26a_{rad}$ (each step $26a_{rad}$ extending radially and longitudinally), and laterally in an alternating path formed by one or more linear lateral steps $26a_{lat}$ (each step $26a_{lat}$ extending laterally and longitudinally). Each step $22a_{rad}$, $22a_{long}$, $26a_{rad}$, and $26a_{lat}$ extends by a particular width or amplitude to achieve a width $W_{22}$, $W_{26}$ for each sipe 22, 26, respectively. When each sipe 22, 26 extends in an alternating path in each of its primary directions, a waffle-like, or egg-crate-like, sipe surface is formed. Although a single step $22a_{long}$ is shown between each radial groove 28 in FIG. 1, it is understood that one or more steps $22a_{long}$ may extend between each groove 28. It is also understood that each sipe 22, 26 may only extend in one of its primary directions in an alternating path or manner.

When sipes 22, 26 extend in alternating paths, the alternating paths allow the sides of each sipe 22, 26 to interlock, and thereby resist shearing and other forces operating along each sipe 22, 26 and any relative movement encouraged by such forces. This resistive interlocking tends to stiffen each tread element 12. The increase in stiffness may recover at least a portion of the stiffness lost due to the general presence of each such sipe 22, 26 in tread element 12. The interlocking effect is heightened when the extension of each sipe 22, 26 extends in an alternating path in each of its primary directions. To promote effective interlocking, in one embodiment, the alternating path in the radial direction of each sipe 22, 26 includes at least 2.5 steps $22a_{rad}$, $26a_{rad}$, respectively. In other embodiments, each radial alternating path includes at least 3 steps $22a_{rad}$, $26a_{rad}$, respectively. In other embodiments, the direction at which each step extends, as well as the width or amplitude of each step, may vary from an adjacent steps or any other step of any sipe 22, 26. In particular embodiments, widths $W_{22}$, $W_{26}$ of each sipe 22, 26, respectively, may be sized not to exceed the width $W_{28}$ of radial groove 28. Accordingly, each primary extension of a sipe 22, 26 that extends in an alternate path may include a variety of differently shaped and sized steps, and/or may include steps shape and/or sized differently from steps of other sipes 22, 26. Any other sipe design may also be employed, which may utilize, for example, alternating paths that extend in only one direction or paths that may be linear or arcuate.

With reference to FIG. 5, the tread 10 of FIGS. 1-5 is shown in a worn state. Specifically, in the embodiment shown, the tire tread 10 is worn to top surface 16b to expose a second wear stage having longitudinal grooves 20 and lateral grooves 24. In particular embodiments, the second stage may become exposed with approximately 5-21 mm of tread remaining. For example, in the embodiment shown in FIGS. 1-5, tread remaining upon exposure of the second wear stage is represented by the sum of $H_{20}+Du_{20}$ and/or $H_{24}+Du_{24}$. In particular embodiments, where tread thickness $D_T$ is approximately 20 mm, the second wear layer becomes exposed with approximately 10 mm of tread remaining. As a result of the wear and exposure of the second stage, previously hidden longitudinal grooves 20 and lateral grooves 24 are now exposed to increase the surface void along worn top surface 16b and the volumetric void exposed to top surface 16b. This potentially decreases the contact surface ratio ("CSR") of a footprint (i.e., increases the surface void). In particular embodiments of tread 10, the CSR associated with worn top surface 16b (i.e., a subsequent wear stage) is less than 94% of the CSR of a previously worn top surface 16a, where the surface contact void used to determine the CSR does not include voids associated with ornamental surface features. Ornamental surface features are features that have a depth of less than approximately 5 mm, or in other embodiments, less than approximately 3 mm. Ornamental surface features may also be defined to have a depth equal to or less than approximately 5-20% of height $H_{14}$ of longitudinal groove 14, and in particular embodiments, equal to or less than approximately 10% of the height $H_{14}$. The CSR associated with a subsequently worn top surface 16b, or a subsequent wear stage, in other embodiments, is greater than 75% of the CSR of a preceding top surface 16a. In yet another embodiment, the CSR associated with surface 16b, or a subsequent wear stage, is 91% of the CSR of a top surface 16a, or a previous wear stage. Top surface 16a may be the initial top surface or a previously worn surface associated with a wear stage preceding the exposure of top surface 16b. The exposure of grooves 20, 24 parses, or at the very least provides a discontinuity within, each tread element 12 to reduce the stiffness thereof. Grooves 20, 24 may also provide more effective traction edges and/or increases the amount of traction edges along tread surface 16b.

Figure 8:
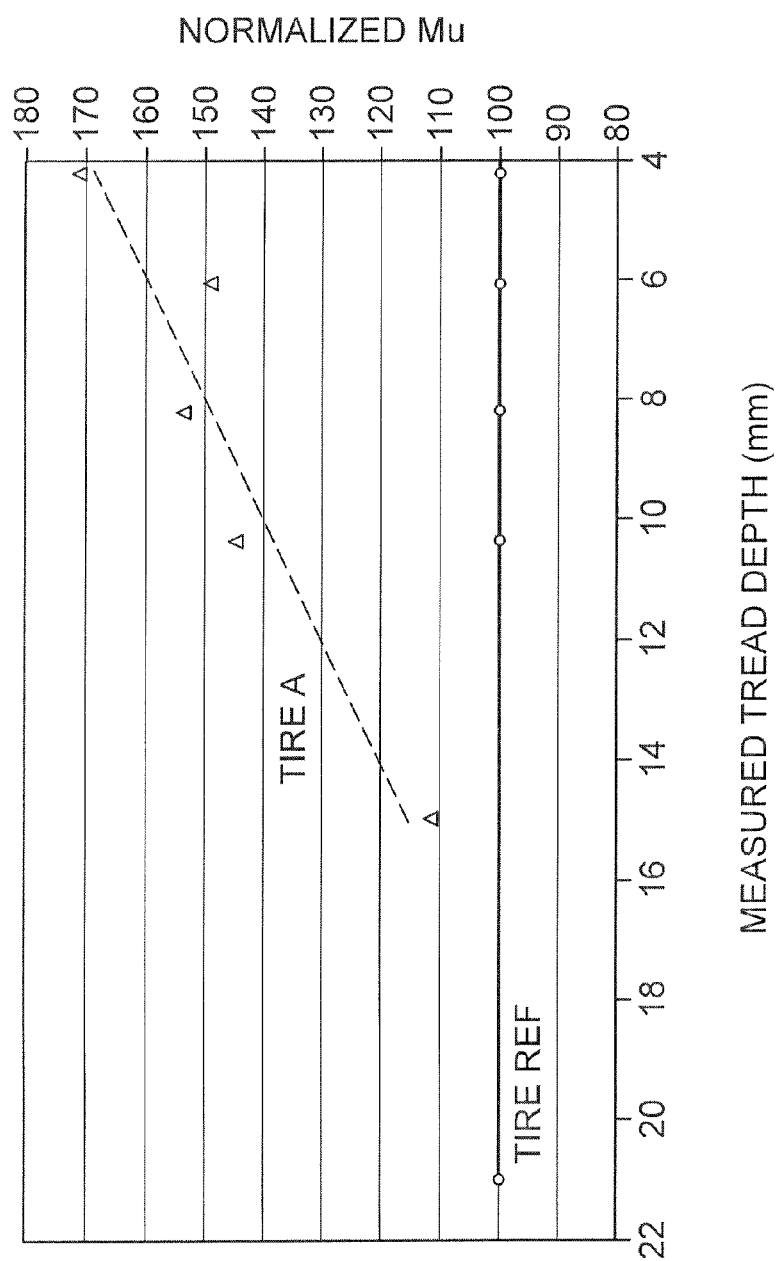
FIG. 8 is a chart representing analytical braking adherence performance (Mu) of a reference tire (Tire REF) and a Tire A, where Tire A included a tread similar to the tread shown in FIGS. 1-5 and Tire REF represents a tire of conventional design. The braking performance of each tire was measured at various worn (buffed) tread depths while the tire was operating at 64 kilometers per hour (KPH) upon a polished concrete operating surface having 1.5 millimeters (mm) of standing water.

The benefits of the tread design shown in FIGS. 1-5 are exemplified in the chart shown in FIG. 8. FIG. 8 generally compares the wet braking traction test results of a tire (Tire A) having the grooves 20, 24 and sipes 22, 26 shown in FIGS. 1-5 against a reference tire (Tire REF) not having such features. Specifically, the chart displays the wet traction measurements of Tire A relative to the measurements of Tire REF, where each tire was tested at particular worn (buffed) tread depths under controlled test conditions. In particular, each test was performed by mounting each tire on a spindle. Through the spindle, a constant vertical load was applied to each test tire, thereby forcing the tire against an operating surface at the tire footprint while operating at 64 kilometers per hour (KPH). The operating surface comprised polished concrete and included approximately 1.5 mm of standing water. During each test, a braking force (Fx) was applied to the rotating tire and measured until locking the tire/wheel to cease tire rotation (that is, when the rotational velocity of the tire is zero). Slip occurs when, at the footprint, the tire's angular velocity of the tire ($[\Omega]$) is less than its free-rolling angular velocity ($\Omega_o$). The slip ratio (SR) generally represents the difference between the two velocities, and may be expressed as $SR=(\Omega/\Omega_o)-(\Omega_o/\Omega_o)$. For example, when the tire becomes locked, the rotational velocity is zero and the slip ratio is −1.

During the test, Mu values for were calculated for particular tire angular velocities (slip ratios) until the tire became locked due to braking forces. Mu is determined by dividing the braking force by the constant vertical load applied to each tire. Using the average Mu value between 5% and 45% slip for each tire, the Mu values for Tire A and Tire REF were normalized by dividing each by the average Mu value for Tire REF. Accordingly, the normalized average Mu for Tire REF was 100%. As represented in FIG. 8, the normalized average Mu values for each test tire were then plotted against the measured tread depth of each test tire, where the plotted tread depth represents $D_1-Du_{14}$ (i.e., the height $H_{14}$ of longitudinal groove 14). Tire REF and Tire A were each formed of the same tread material (compound). For Tire A, longitudinal grooves 20 and lateral grooves 24 were positioned 10 mm below top surface 16a of intermediate elements 12a (i.e., groove depths $Do_{20}$, $Do_{24}$ equaled approximately 10 mm, respectively), while each of the grooves 20, 24 included a height $H_{20}$, $H_{24}$ of approximately 6.5 mm, respectively. Accordingly, depths $Du_{20}$, $Du_{24}$ were each equal to approximately 3.5 mm. Finally, longitudinal grooves 14 in Tire A extended approximately 15 mm from initial top surface 16a (i.e., groove height $H_{14}$ equaled 15 mm). As shown in the chart, the inventive features of Tire A achieved improved traction relative to the reference tire under the particular operating conditions. Specifically, the test results show that Tire A provides approximately 10% increase over the Tire REF at a measured tread depth of 15 mm. This improvement continues to increase through a measured tread depth of approximately 4 mm, at which the increase in performance is a 70% improvement over the Tire REF. Although the inventive provision of grooves 20, 24 and sipes 22, 26 provide an improvement over a tire not having such tread features, the amount of improvement may vary according to the size, quantity, and arrangement of such tread features within each specific tread.

A tread 10 having tread elements 12 may be formed independently for subsequent bonding to form a retreaded tire carcass, or may be molded and cured with a tire belt or the like to form a new tire. The features of each tread element 12, namely, longitudinal groove 20, lateral grooves 24, sipes 22, 26, and radial groove 28 may be formed by any known means during the formation of tread 10. For example, grooves 20, 24 may be formed by mold elements located along tread bottom 18 in a retread tread, with or without the existence of any sipes 22, 26. In one embodiment, a mold element 40 may be used to form one or more of grooves 20, 24, sipes 22, 26, and radial groove 28 in a tread element 12, which may used to form a retread tread or a tread on a new tire. Mold element 40 may be located along tread top surface 16, and removed from tread 10 by way of top surface 16 after tread 10 has been cured. Mold element 40 may be used to form any tread design, feature, or embodiment discussed previously with respect to tread 10.

As shown in FIGS. 6-7, mold element 40 may include longitudinal groove form 42 and lateral groove form 46, each of which are used to form longitudinal groove 20 and lateral groove 24, respectively, below a contact surface of top surface 16 of tread 10 as discussed above. Mold element 40 may also include longitudinal sipe forms 44 and lateral sipe forms 48, each of which may be used to form one or more sipes 22, 26, respectively, as discussed above. Sipe forms 44, 48 may extend from longitudinal and lateral groove forms 42, 46, respectively. Further, sipe forms 44, 48 may extend between respective groove forms 42, 46 and a contact surface of top surface 16. Each sipe form 44 may include steps $44a_{rad}$ and $44a_{long}$, which correspond to steps $22a_{rad}$ and $22a_{long}$, respectively, of a corresponding sipe 22. Similarly, each sipe form 48 may include steps $48a_{rad}$ and $48a_{lat}$, which correspond to steps $26a_{rad}$ and $26a_{lat}$, respectively, of a corresponding sipe 26. The steps of each form 44, 48 may be arranged to achieve the sipes 22, 26 and any corresponding steps of thereof as contemplated above. Lateral groove forms 46 and/or sipe forms 48 may extend from each of the lateral sides of the longitudinal groove form 42 as shown in FIGS. 6-7, which, as shown, may be longitudinally offset in a longitudinally alternating arrangement along longitudinal groove form 42, and as discussed above with regard to the tire tread 10, and corresponding lateral grooves 24 and sipes 26. Finally, a sipe-intersecting extension 50 may exist, which may be used to form radial or sipe-intersecting groove 28 of tread 10. In other embodiments, extension 50, may extend entirely or partially in a direction other than the radial direction, such as, for example, being included relative to a tire rolling direction. Extension 50 facilitates a simple intersection of one or more sipe forms 44, 48 by providing a mass to which said forms 44, 48 may attach. In particular embodiments, the width $W_{44}$, $W_{48}$ of each sipe form 44, 48, respectively, is equal to or less than a width $W_{50}$ of radial extension 50. Mold element 40, as shown in FIG. 7-8, represents a mold element 40 capable of forming the internal features of the intermediate tread elements 12a shown in FIGS. 1-5. Sipes 22, 26 may facilitate removal of mold element 40 from tread 10 by way of top surface 16 or bottom surface 18 by creating an opening through which mold element 40 may pass. Other variations of mold element 40 may exist, as the network of grooves 20, 24 and sipes 22, 26 may comprise any desired arrangement, including those discussed above in relation to tire tread 10.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A multi-stage tire tread having a contact surface and a plurality of wear layers, each of said plurality of wear layers being located at a different depth of the tire tread, the tread comprising:

one or more tread elements including a contact surface and having a first wear layer and a second wear layer, wherein the second wear layer is located below the first wear layer;

a submerged longitudinal groove extending in a longitudinal direction within the second wear layer of the tread element, wherein said submerged longitudinal groove becomes exposed after a depth of the first wear layer has been worn;

one or more longitudinal sipes extending within the first wear layer between the contact surface and the submerged longitudinal groove, the one or more longitudinal sipes alternate laterally along a radial direction through the first wear layer;

one or more submerged lateral grooves each extending from the longitudinal groove in a lateral direction within the second wear layer of the tread element;

one or more lateral sipes extending within the first wear layer between the contact surface and one of the one or more lateral grooves, the one or more lateral sipes alternate longitudinally along a radial direction through the first wear layer; and one or more sipe-intersecting grooves extending through a thickness of the tread and forming an intersection between the one or more lateral sipes and the one or more longitudinal sipes, wherein the one or more longitudinal sipes extend longitudinally in a laterally alternating path, wherein the laterally alternating path comprises a plurality of steps, and wherein each of the plurality of steps are bounded by at least one junction at the one or more sipe-intersecting grooves.

2. The tire tread of claim 1, wherein the longitudinal groove extends parallel to a tread centerline extending longitudinally along tread.

3. The tire tread of claim 1, wherein at least one of the lateral grooves extends perpendicular to a tread centerline extending longitudinally along tread.

4. The tire tread of claim 1, wherein the one or more lateral sipes extend laterally in a longitudinally alternating path.

5. The tire tread of claim 4, wherein the longitudinally alternating path along the lateral direction has a longitudinal amplitude defined by longitudinal extrema of the longitudinally alternating path, and wherein the longitudinal amplitude is less than a lateral submerged groove width.

6. The tire tread of claim 4 wherein the one or more sipe-intersecting grooves have a width, wherein the longitudinally alternating path along the lateral direction has a longitudinal amplitude defined by longitudinal extrema of the longitudinally alternating path, and wherein the longitudinal amplitude is less than the width of the one or more sipe-intersecting grooves.

7. The tire tread of claim 1, wherein the laterally alternating path comprises at least two and one-half steps.

8. The tire tread of claim 1, wherein the one or more sipe-intersecting grooves have a width, the width being greater than a width of the one or more lateral sipes and the one or more longitudinal sipes, wherein the width of the one or more longitudinal sipes is an amplitude of the laterally alternating path of the one or more longitudinal sipes in the radial direction.

9. The tire tread of claim 1, wherein the one or more sipe-intersecting grooves are radial grooves.

10. The tire tread of claim 1, wherein each of the one or more submerged lateral grooves has a pair of ends, one of the ends being in communication with a side surface of the tread element, and the other of the ends being in communication with the submerged longitudinal groove.

11. The tire tread of claim 1, wherein the one or more lateral sipes extend laterally in a longitudinally alternating path and/or radially in an alternating path.

12. The tire tread of claim 1, wherein the one or more lateral sipes extend laterally in a longitudinally alternating path.

13. The tire tread of claim 1, wherein spacing between each of the one or more submerged lateral grooves along one side of the submerged longitudinal groove is between 40 and 50 mm.

14. The tire tread of claim 1, wherein the laterally alternating path along the longitudinal direction has a lateral amplitude defined by lateral extrema of the laterally alternating path, and wherein the lateral amplitude is less than a longitudinal submerged groove width.

15. The tire tread of claim 1, wherein the one or more sipe-intersecting grooves have a width, wherein the laterally alternating path along the longitudinal direction has a lateral amplitude defined by lateral extrema of the laterally alternating path, and wherein the lateral amplitude is less than the width of the one or more sipe-intersecting grooves.

* * * * *